L. A. HOERR.
BRAKE MECHANISM.
APPLICATION FILED AUG. 17, 1914.
1,149,579.
Patented Aug. 10, 1915.
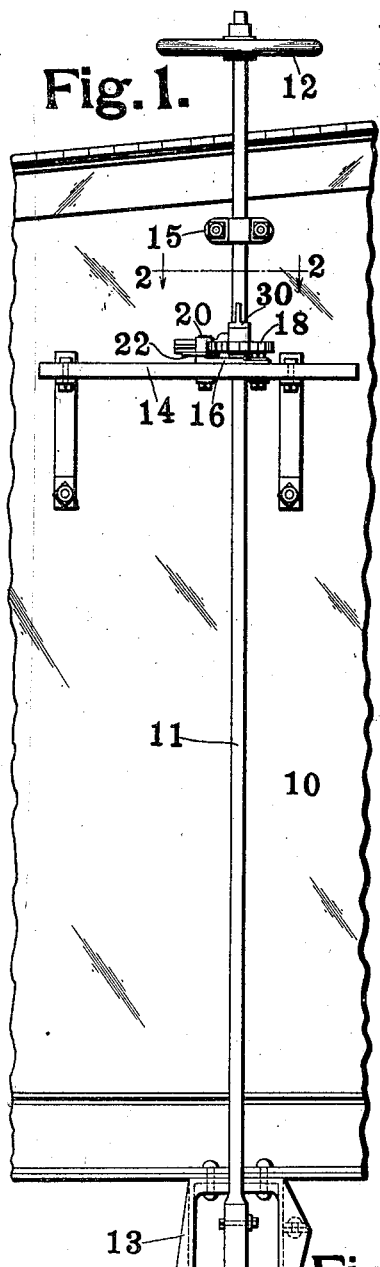
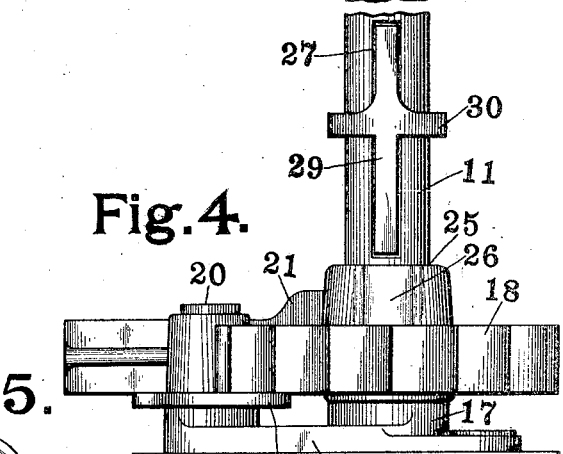
WITNESSES:
Charles A. Becker
W. F. Alexander
INVENTOR.
LOUIS A. HOERR,
BY E. E. Huff
HIS ATTORNEY.

UNITED STATES PATENT OFFICE.

LOUIS A. HOERR, OF ST. LOUIS, MISSOURI.

BRAKE MECHANISM.

1,149,579.

Specification of Letters Patent.

Patented Aug. 10, 1915.

Application filed August 17, 1914. Serial No. 357,054.

*To all whom it may concern:*

Be it known that I, LOUIS A. HOERR, a citizen of the United States of America, residing at the city of St. Louis, State of Missouri, have invented a certain new and useful Brake Mechanism, of which the following is such a full, clear, and exact description as will enable any one skilled in the art to which it appertains to make and use the same, reference being had to the accompanying drawings, forming part of this specification.

My invention relates to brake mechanism for railway cars and, more particularly, to simple and efficient means for securing the ratchet wheel of the brake mechanism to the brake staff.

The object of my invention is to provide a simple and strong construction which will positively prevent the key from working out of the key-way and which will also effectively hold the wheel against longitudinal movement on the shaft.

In the accompanying drawings, which illustrate a brake mechanism made in accordance with my invention, Figure 1 is a view of a portion of the end of a railway car on a reduced scale; Fig. 2 is a section taken on the line 2—2 of Fig. 1; Fig. 3 is a front elevation of the parts shown in Fig. 2, the parts being in their normal position; Fig. 4 is a view similar to Fig. 3, but showing the brake staff raised to allow the insertion or removal of the key; and Fig. 5 is a cross section of the brake staff showing a slight modification.

Like marks of reference refer to similar parts in the several views of the drawings.

10 is a railway car and 11 the brake staff supplied with the usual hand wheel 12. The brake staff 11 is held in position on the car 10 by means of the lower brake staff step 13, the upper brake staff step 14 and the brake staff bearing 15. All of these parts may be of any old and well known construction.

Carried on the upper brake staff step 14 is a bearing plate 16 provided with a boss 17 through which the brake staff 11 passes. This boss 17 also serves to support the ratchet wheel 18. The plate 16 is also provided with a stud 20 on which is mounted a pawl or dog 21 which coöperates with the ratchet wheel 18. This pawl 21 is provided with an integral plate 22 projecting beneath the ratchet wheel 18 so as to prevent the pawl from being accidentally displaced. The wheel 18 is itself held against longitudinal movement in a manner which will hereafter be described.

The hub of the ratchet wheel 18 is provided with an opening 25 through which the brake staff 11 passes. A key-way 26 is formed in one side of this opening. The brake staff 11 also has formed in it a key-way. This key-way may be of any suitable form. In Figs. 1 to 4, I have shown it as an opening 27 of rectangular cross section, while in the modification shown in Fig. 5, it consists of a flattened portion 28.

29 is a key which is adapted to project partly into the key-way 27 or 28 and partly into the key-way 26 in the hub of the wheel 18, thus preventing relative rotation between the two parts. Formed integral with the key 29 is a collar 30 surrounding the brake shaft 11. This collar 30 is made somewhat elongated in one direction so as to allow the collar to be slipped down over the brake staff 11. After it has reached the position shown in Fig. 4, the staff may be lowered into the position shown in Fig. 3, the collar 30 forming an abutment bearing on the hub of the wheel 18 and thus holding the wheel against longitudinal movement. As the upper end of the key 29 is engaged by the end of the key-way 27, the key is effectively locked against longitudinal movement by the staff itself. The staff is prevented from being moved upwardly by means of a locking ring 31 passing through the lower end of the staff, as shown in Fig. 1. Even though this ring 31 should become disengaged from the staff, the weight of the staff itself, which is usually about forty pounds, will be sufficient to hold the parts in normal position by means of gravity alone. The key 29 is shown as projecting some distance above the collar 30. This construction is used where elongated key-ways are formed in the staff. In case the invention is applied to a new brake mechanism, it will not be necessary to have the key project above the collar as the key-way may be made correspondingly shorter so as to engage the upper end of the key and lock it against longitudinal movement. When it is desired to place the key in position or remove it, it is only necessary to remove the ring 31 and draw the staff up into the position shown in Fig. 4.

It will be evident that while my construction is very simple, it effectively locks the key in position, thus not only preventing any longitudinal movement of the ratchet wheel 18 on the shaft, but positively preventing the wheel from becoming detached from the shaft so as to rotate relatively thereto.

Having fully described my invention, what I claim as new and desire to secure by Letters-Patent of the United States is:

1. The combination with a brake staff, of a ratchet wheel provided with an opening for the passage of the staff and with a key-way at one side of said opening, a key-way formed in said staff, a key projecting into both of said key-ways, and an abutment carried by said key and adapted to engage with said wheel to prevent its upward movement, said key being locked by the staff from disengagement with the way in the wheel when the parts are normal.

2. The combination with a brake staff, of a ratchet wheel provided with an opening for the passage of the staff and with a key-way at one side of said opening, a key-way formed in said staff, a key projecting into both of said key-ways, and a collar carried by said key and surrounding the staff, said collar being adapted to engage with the wheel to prevent its upward movement, said key being locked by the staff from disengagement with the way in said wheel when the parts are in normal position.

3. The combination with a brake staff, of a ratchet wheel provided with an opening for the passage of the staff and with a key-way at one side of said opening, a key-way formed in said staff, a key projecting into both ways, and an abutment carried by said key and adapted to engage with said wheel to prevent its upward movement, said key projecting above said abutment and having its upper end engaged by the end of the way in the staff to prevent its disengagement from the way in the wheel when the parts are in normal position.

4. The combination with a brake staff, of a ratchet wheel provided with an opening for the passage of the staff and with a key-way at one side of said opening, a key-way formed in said staff, a key projecting into both of said ways, and a collar carried by said key and surrounding said staff, said collar being adapted to engage with said wheel to prevent its upward movement, said key projecting above said collar and having its upper end engaged by the end of the way in the staff to prevent disengagement of the key from the way in the wheel when the parts are in normal position.

5. The combination with a brake staff, of a ratchet wheel provided with an opening for the passage of the staff and with a key-way at one side of said opening, a key-way formed in said staff, a key projecting into both of said ways, an abutment carried by said key and adapted to engage with the wheel to prevent its upward movement, and a pawl for said wheel, said pawl having a portion projecting below said wheel to prevent the upward movement of the pawl, said key being locked by the staff from disengagement from the way in said wheel when the parts are in normal position.

In testimony whereof, I have hereunto set my hand and affixed my seal in the presence of two subscribing witnesses.

LOUIS A. HOERR. [L. S.]

Witnesses:
W. A. ALEXANDER,
G. M. SHORR.